United States Patent [19]

Harada et al.

[11] Patent Number: 5,027,263
[45] Date of Patent: Jun. 25, 1991

[54] SWITCHING POWER SOURCE MEANS

[75] Inventors: Kosuke Harada, Fukuoka; Hiroshi Sakamoto, Ohnojyo, both of Japan

[73] Assignee: Kyushu University, Fukuoka, Japan

[21] Appl. No.: 323,381

[22] Filed: Mar. 14, 1989

[30] Foreign Application Priority Data

Sep. 16, 1988 [JP] Japan ................ 63-230133

[51] Int. Cl.$^5$ ........................................ H02M 3/335
[52] U.S. Cl. ........................................ 363/16; 363/21
[58] Field of Search .................. 363/16, 17, 21, 39, 363/40, 24

[56] References Cited

U.S. PATENT DOCUMENTS

| 4,605,997 | 8/1986 | Kirk | 363/16 |
|---|---|---|---|
| 4,642,150 | 2/1987 | Raets | 363/21 X |
| 4,692,851 | 9/1987 | Attwood | 363/16 |
| 4,736,284 | 4/1988 | Yamagishi et al. | 363/16 |
| 4,745,536 | 5/1988 | Hirose et al. | 363/21 |
| 4,768,141 | 8/1988 | Hubertus et al. | 363/16 |
| 4,814,962 | 3/1989 | Magalhaes et al. | 363/16 |

FOREIGN PATENT DOCUMENTS

| 0032525 | 3/1977 | Japan | 363/16 |
|---|---|---|---|
| 0035679 | 4/1981 | Japan | 363/16 |

OTHER PUBLICATIONS

Koosuke Harada, Tamotsu Ninomiya and Michio Kohno "Optimum Design of an RC Snubber for a Switching Regulator by Means of the Root Locus Method", pp. 158–167, 1978.
Koosuke Harada and Katsuaki Murata "Ferroresonant Converters with High-Frequency Drive" pp. 355–359, 1983.
Kwang-Hwa Liu and Fred C. Lee "Zero-Voltage Switching Technique in DC/DC Converters", pp. 58–70, 1986.
O. D. Patterson and D. M. Divan "Pseudo-Resonant Full Bridge DC/DC Converter", pp. 424–430, 1987.
Nobuyoshi Nagagata, "Regenerative Control of Secondary Energy for Switching Power Supplies" Publication of Inductive Products Div. Matsushita Electronic Components Co., Ltd. PE88-38, 9/88.

Primary Examiner—Steven L. Stephan
Assistant Examiner—Kristine Peckman
Attorney, Agent, or Firm—Spencer & Frank

[57] ABSTRACT

A switching power source means comprises a DC voltage source, a first switch element, a low-pass filter connectable to the DC voltage source through the first switch element, and a second switch element connected to the input end of the low-pass filter, the switch elements being coupled to the DC voltage source either directly or through a transformer and being operable in such a manner that an output of DC or AC of a desired frequency can be derived across the output end of the low-pass filter. With the invention, a reactor is connected in parallel across the input end of the low-pass filter, which reactor being is adapted to charge and discharge parasitic capacitances of the switch elements, thus preventing surge currents in the switch elements.

8 Claims, 5 Drawing Sheets

FIG._2A
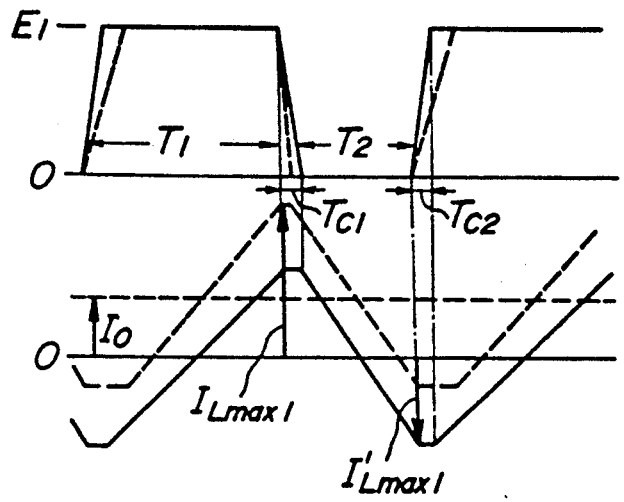
FIG._2B
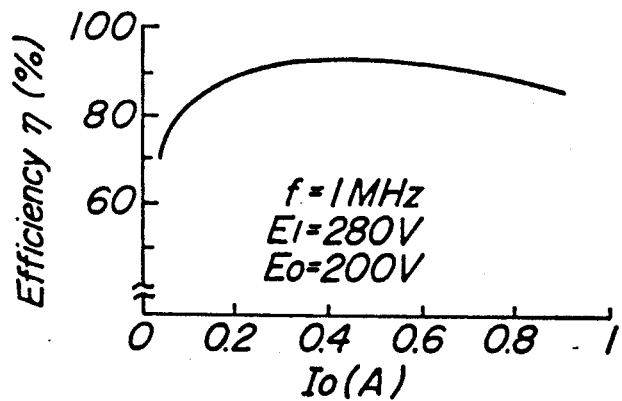
FIG._2C
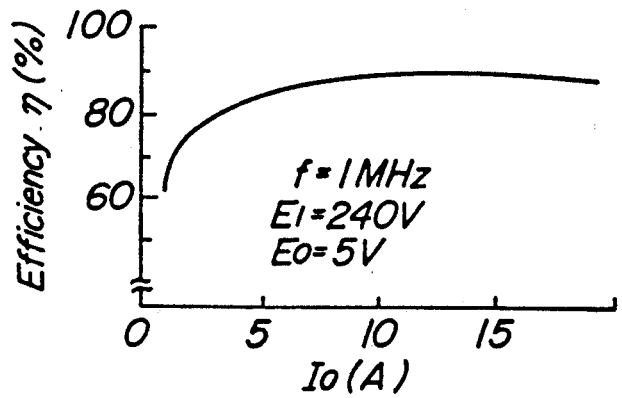

SWITCHING POWER SOURCE MEANS

BACKGROUND OF THE INVENTION

1. Field of the Invention

This invention relates to a switching power source means having a DC voltage source with at least two switch elements connected thereto, so as to produce a DC output, or an AC output of a desired frequency, by turning on and off the switch elements in an alternate manner. In particular, the invention relates to prevention of surge currents and switching losses due to parasitic capacitors in the switching power source means.

2. Description of the Prior Art

A switching power source means of the above-mentioned type is generally small and highly efficient, and has been widely used, for instance, as a power source for a computer data processing system. In the case of a power source means with a large output capacity, or an AC power source means producing sinusoidal AC output from a DC power source, the power source means is often made controllable by connecting paired switch elements thereto so as to regulate the power or frequency of its output simply by alternately changing over the operating state of the switching elements.

FIG. 6 shows a circuit diagram of a typical example of a conventional controllable power source means, and waveforms at different points in the circuit thereof are shown in FIGS. 7A and 7B. Paired switch elements, i.e., a first switch element 1 and a second switch element 2, are joined in series at a point 7 and serially connected across a DC voltage source 5. A low-pass filter, which is formed of a choke coil 3 and a capacitor 4, is connectable to the DC voltage source 5 through the first switch element 1. An input end of the low-pass filter is connected parallel to from a connection with the second switch element 2. A load 6 is connected in parallel with the output end of the low-pass filter. If switch elements 1 and 2 are alternately turned on and alternately turned off, while changing the ratio between ON-time and OFF-time of the switch element 2 in a sinusoidal manner as shown by the curve in FIG. 7A, a series of pulse width modulated (PWM) voltage pulses are generated at the point 7 between the two switch elements 1 and 2. After elimination of switching frequency components from the series of the voltage pulses by the low-pass filter made of the choke coil 3 and the capacitor 4, a sinusoidal AC output voltage can be obtained as shown by the curve in FIG. 7B.

The above functional description of the switching power source means of FIG. 6 is based on the assumption that the switch elements 1 and 2 perform an exactly rectangular ON-OFF switching operation as ideal switch elements can do, and that control signals for driving the ON-OFF operation are also exactly rectangular. Performance of actual switch elements to be used, however, deviates from the above-mentioned exact rectangular switching operation due to intrinsic characteristics of individual switch elements, and the deviation causes certain difficulties during switching operation.

The difficulties during the switching operation will be explained by referring to a typical switch element formed of a metal oxide semiconductor field effect transistor (MOS-FET) of FIG. 8. MOS-FET's are quite frequently used as the switch elements 1 and 2 of FIG. 6. The circuit of FIG. 8 is essentially the same as that of FIG. 6 except that the switch elements 1 and 2 are made of MOS-FET1 and MOS-FET2, respectively.

The MOS-FET is different from a conventional bipolar transistor in that the MOS-FET is free from delay in OFF operation due to storage time caused by residual carriers. Thus, if control signals applied to the gates of MOS-FET1 and MOS-FET2 of FIG. 8 are exactly rectangular, simultaneous ON states of the MOS-FET1 and MOS-FET2 will never occur. However, the actual MOS-FET has a comparatively large parasitic capacitor between its drain and source on the order of about several hundred pF to several ten pF. At the time of turn-ON and turn-OFF of the paired MOS-FET1 and MOS-FET2, there is a serious problem of how to handle the electric charge stored by the parasitic capacitors so as to eliminate adverse effects of the stored charge on the turning OFF function.

FIG. 9 shows an equivalent circuit of a MOS-FET. Due to its configuration, parasitic capacitors are inevitable; namely, $C_{dg}$ between the gate and the drain $C_{ds}$ between the drain and the source, and $C_{gs}$ between the gate and the source. The value of resistance $R_{dg}$ between the drain and gate varies greatly from almost zero to infinity depending on the gate-source voltage, and the zero value corresponds to the ON state and the infinity value corresponds to the OFF state. A parasitic diode $D_o$ must be considered between the drain and the source.

Phenomena relating to the turn-ON and turn-OFF of the equivalent circuit of FIG. 9 will now be analyzed. Electric charge stored in the drain-source parasitic capacitor $C_{ds}$ of each MOS-FET is discharged through the drain-Source resistance $R_{ds}$ when it is turned ON, so that when the paired MOS-FET's are switched over from one to the other, a large surge current is produced. Such surge current does not occur at the turning OFF of MOS-FET1 FET1 of FIG. 8 from its ON state, because the drain-source parasitic capacitors $C_{ds}$ of the two MOS-FET1 and MOS-FET2 hold their charges. However, a large surge current flows through the on-time drain-source resistance $R_{ds}$ of the MOS-FET2, when the MOS-FET2 is turned ON from its OFF state. The surge current is due to two reasons: namely, the charge of the drain-source parasitic capacitor $C_{ds}$ of the MOS-FET2 is discharged through the on-time drain-source resistance $R_{ds}$, and the drain-source parasitic capacitor $C_{ds}$ of MOS-FET1 is directly charged by the DC voltage source 5 through the on-time drain-source resistance $R_{ds}$ of the MOS-FET2. Similarly, a large surge current flows through the on-time drain-source resistance $R_{ds}$ of the MOS FET1 when the MOS-FET2 is turned OFF and when MOS-FET1 is turned ON from its OFF state due to the same two reasons described above.

As a result, the charge stored in the drain-source parasitic capacitor $C_{ds}$ of each MOS-FET of the paired switch elements of FIG. 8 causes a large surge current through the on-time source drain resistance $R_{ds}$ when the two-MOS FET's are switched over from one to the other. The energy of such surge current is converted into and consumed as heat, which means not only power loss and temperature rise of the switch element but also generation of noise. Further, intensity of such phenomenon increases with the rise of the switching frequency of the paired switch elements. Thus, the occurrence of such surge current makes it very difficult to use high frequency switchover of the paired switch elements of the switching power source means for improvement of its efficiency. Further, if the peak value of such surge current is too high, it may cause break-down of the switch elements.

Several protective methods against the surge current accompanying the switchover of the switch elements have been proposed, and FIG. 10A through FIG. 10C illustrate some of them. Gate resistors $8_{a1}$ and $8_{a2}$ of several hundred ohms can be serially connected to the gates of the MOS-FET1 and MOS-FET2 as shown in FIG. 10A. Functions of such gate resistors include reduction of rate of rise of the gate voltage of each MOS-FET, gradual change of the value of the drain-source resistance $R_{ds}$ of each MOS-FET1 or MOS-FET2 at the time of switchover until it gradually settles into its ON state, and suppression of the peak value of the surge current even if not eliminated. FIG. 10B shows saturable magnetic cores $8_{b1}$ and $8_{b2}$ which are connected in series to the MOS-FET1 and MOS-FET2, respectively. Snubber circuit $8_{c1}$ and $8_{c2}$, each comprising for instance a resistor and a capacitor, can be connected in parallel to the MOS-FET1 and MOS-FET2, respectively, as shown in FIG. 10C. The snubber circuits suppress rapid change of voltage and current, and they prevent occurrence of any surge currents.

The inventors found that the conventional protective methods could not ensure complete prevention of the occurrence of the above-mentioned surge current. Even if the protective methods are used, electric charge stored in the parasitic capacitors of the MOS-FET's is eventually consumed as heat in the drain-source resistance $R_{ds}$. Thus, with increase of the frequency of switchover of switch elements in the switching power source means, its power consumption or heat generation increases. In short, prevention of occurrence of the surge and reduction of switching loss current at switchover of the switch elements is a very important problem to be solved in the conventional switching power source means.

SUMMARY OF THE INVENTION

Therefore, an object of the present invention is to solve the above-mentioned problems of the prior art by providing an improved switching power source means which prevents occurrence of the surge current due to parasitic capacitors of switch elements and of a transformer, if used, so as to enable high efficiency and size reduction of such means.

A switching power source means according to the invention has a DC voltage source, a first switch element, a low-pass filter connectable to the DC voltage source through the first switch element, and a second switch element connected to input end of the low-pass filter, which switch elements are operable in such a manner that a DC output or an AC output of a desired frequency can be produced across output end of the low-pass filter. Further, a reactor is connected in parallel to one of the switch elements, e.g., the second switch element, which reactor is adapted to charge and discharge parasitic capacitors of the switch elements, so as to prevent the surge currents in the switch elements.

With the reactor connected across the second switch element, no surge current is caused at switchover of the switch elements, and it is made possible to provide a small yet highly efficient switching power source means which is particularly suitable for use in a DC constant-voltage power source, an inverter, an AC uninterruptible power supply, a battery charger, controllers of motors of various types, and the like.

BRIEF DESCRIPTION OF THE DRAWINGS

For a better understanding of the invention, reference is made to the accompanying drawing, in which:

FIG. 2A shows waveforms of current and voltage at joint 7 between two switch elements in the power source means of FIG. 1;

FIG. 2B shows current versus efficiency characteristics of the power source means of FIG. 1 in the case of producing an AC output;

FIG. 2C shows current versus efficiency characteristics of the power source means with a circuit configuration of FIG. 4 in the case of producing a DC output;

Figure 1:
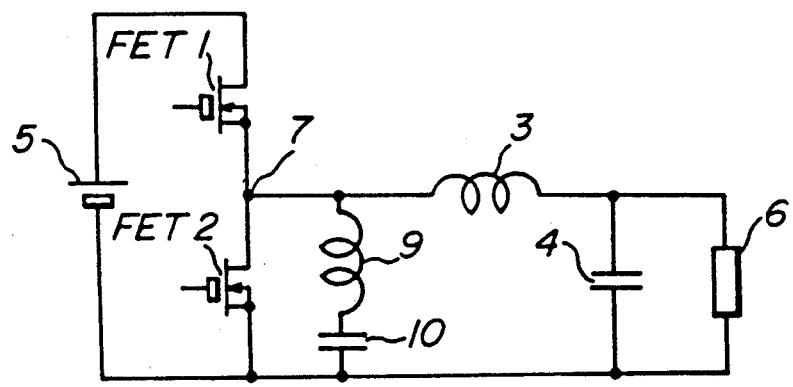
FIG. 1 is a circuit diagram of the fundamental configuration of a switching power source means according to the invention.

Throughout different views of the drawing, 1, 2, 11, 13, 14 are switch elements (MOS-FET's), 3 is a choke coil, 4, 10, 12, 16 are capacitors, 5 is a DC voltage source, 6 is a load, 7 is a joint, $8_{a1}$, $8_{a2}$ are gate resistors, $8_{b1}$, $8_{b2}$ are saturable magnetic cores, $8_{c1}$, $8_{c2}$ are snubber circuits, and 9, 15 are reactors.

DESCRIPTION OF THE PREFERRED EMBODIMENT

The invention will be described in further detail by referring to embodiments.

FIG. 1 shows the principles of a switching power source means according to the invention. In the figure, MOS-FET1 and MOS-FET2 are examples of switch elements 1 and 2 of the ensuing embodiments. The output voltage from the switching power source means is controlled by alternately turning ON and alternately turning OFF the switch elements 1 and 2 so as to regulate the duration ratio of ON state and OFF state, as in the case of conventional switching power source means. At each switchover from one switch element to the other, "dead time" is provided during which the two switch elements are both turned OFF.

The embodiment of FIG. 1 is different from the prior art in that a reactor 9 is connected across the second switch element 2 or MOS-FET2. The reactor 9 stores energy in the form of current therein during a half cycle prior to the dead time, and the stored energy is used for charging and discharging of parasitic capacitors of the switch elements during the dead time wherein the two switch elements are both turned OFF. Thus, the internal resistance of the switch elements is freed from adverse effects of charging currents to and discharging currents from parasitic capacitors of the switch elements. A capacitor 10 is used to cut off a DC component in the voltage at point 7 between the two switch elements 1 and 2. The capacitance of the capacitor 10 is selected in such a manner that the resonant frequency of the circuit formed of the reactor 9 and the capacitor 10 is made much lower than the switching frequency of the switch elements 1 and 2.

Figure 9:
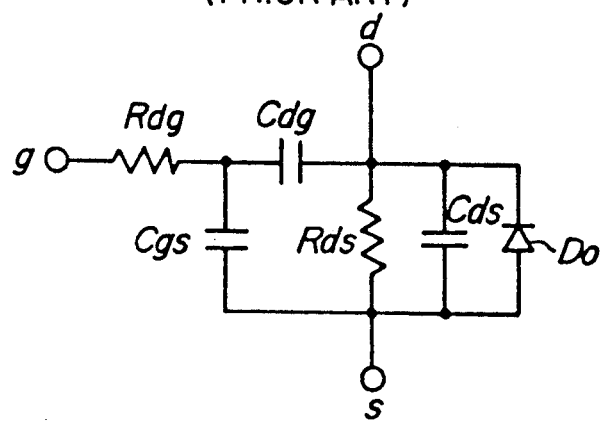
FIG. 9 is an equivalent circuit of a MOS-FET.
Figure 10A:
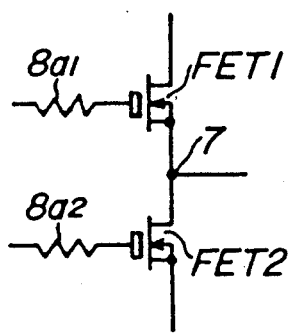
FIG. 10A through FIG. 10C are circuit diagrams of conventional methods for preventing surge currents in switch elements, respectively.
Figure 10B:
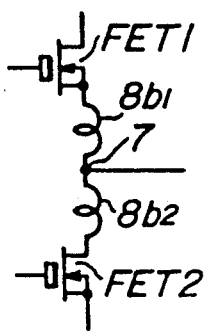
Figure 10C:
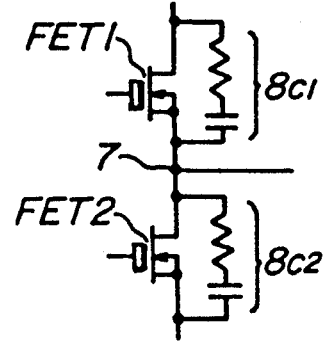

In operation, when the MOS-FET1 is turned ON, a current is fed from the DC voltage source 5 to the reactor 9 through the MOS-FET1 and energy is stored in the reactor 9. At the moment of turn-OFF of the MOS-FET1, the voltage at point 7 is held by parasitic capacitor across the switches, hence FET1 is turned off with zero voltage switching. The current in the reactor 9 cannot change rapidly and it varies in a continuous manner while charging the drain-source parasitic capacitor $C_{ds}$ of MOS-FET1 and discharging the drain source parasitic capacitor $C_{ds}$ of MOS-FET2. Thus, the voltage at point 7 decreases substantially linearly. After the voltage at point 7 reaches zero, the current from the reactor 9 continues to flow through the parasitic diode $D_o$ (see FIG. 9). In this interval, FET2 is turned ON. Thus the zero voltage switching is realized in FET2 and there is no current surge. The voltage appearing across the capacitor 10 depends on both the voltage of the voltage source 5 and time ratio of switching, and the current from the reactor 9 varies at a certain slope in response to the change of the voltage of the capacitor 10, until the direction of the current is reversed so as to cause a current from the capacitor 10 to the MOS-FET2. This current from the capacitor 10 to the MOS-FET2 causes energy storage in the reactor 9.

When the switch FET1 is turned on and FET2 is turned off, the same kind of zero voltage switching arises due to the presence of the dead interval when both switches are off. In this case, however, the direction of the current at point 7 is reversed. During the dead, interval after FET2 is turned off, voltage at point of 7 is increased by charging parasitic capacitor across until the voltage at point 7 equals the voltage of voltage source 5. When MOS-FET2 is turned OFF, parasitic capacitor $C_{ds}$ of MOS-FET2 is charged and parasitic capacitor $C_{ds}$ of MOS-FET1 is discharged by the energy stored in the reactor 9, and the voltage at point 7 increases. After the voltage at a point 7 surpasses the voltage of the voltage source 5, the energy of the current of the reactor 9 is recovered through the parasitic diode $D_o$ of the MOS-FET1. After the voltage at point 7 equals the voltage of source voltage, FET1 is turned ON. Hence zero voltage switching in FET1 is accomplished. The current of the reactor 9 increases with a certain slope, and when its value reaches zero, a current from the voltage source 5 flows through the MOS-FET1 and the reactor 9, so as to cause repetition of similar operation. If both MOS-FET1 and MOS-FET2 are kept OFF during the period of changeover from MOS-FET1 to MOS-FET2 or from MOS-FET2 to MOS-FET1 or during the period of the voltage switchover at point 7, it is possible to prevent the charging and discharging of the parasitic capacitors of the MOS-FET's through the drain-source resistors $R_{ds}$ of the MOS-FET's because such parasitic capacitors are charged and discharged by the energy stored in the reactor 9.

The voltage and current at point 7 between the two switch elements will be discussed now in detail. The upper graph of FIG. 2A shows the theoretical waveform of voltage at point 7, while the lower graph of FIG. 2A shows the theoretical waveform of current through point 7. In the two graphs, solid lines are for no-load conditions and dash lines are for loaded conditions. FIG. 2B and FIG. 2C show measured values of efficiency versus load current $I_o$ characteristics for the configuration of FIG. 1 and for the following configuration of FIG. 4, respectively. High efficiency of the means of the invention was proved; namely, about 95% for the case of FIG. 2B and about 85% for the case of FIG. 2C.

In FIG. 1, if the voltage of the voltage source 5 is represented by Ei and the time ratio of the ON period of the switch element 1 is represented by D, a voltage depending on Ei and D appears across the capacitor 10. If the inductance of the reactor 9 is designated by L, the switching frequency is designated by f and output current is designated by $I_o$, the peak current $I_L$ of the reactor 9, i.e., the current of reactor 9 when the current of MOS-FET1 or MOS-FET2 is zero, can be given by the following equation.

$$I_L = Ei(1-D)D/2fL \qquad (1)$$

In deriving the equation(1), two assumptions were made; namely, that switchover time between the switch elements 1 and 2 is sufficiently short as compared with the ON time of the switch element 1 or 2, and that the width of current change during ON time of the MOS-FET1 is the same as the width of current change during ON time of the MOS-FET2.

The current i through point 7 can be given by the following equation (2) for the ON time of the MOS-FET1 and by the following equation (3) for the ON time of the MOS-FET2.

$$i = [Ei(1-D)t/L] - [D(1-D) Ei/2 \cdot f \cdot L] + I_o \qquad (2)$$

$$i = [Ei \cdot D \cdot t/L] + [D(1-D)Ei/2 \cdot f \cdot L] + I_o \qquad (3)$$

When the MOS-FET1 or the MOS-FET2 is switched from the ON state to OFF state, the parasitic capacitors of the MOS-FET1 and MOS-FET2 are charged by the energy stored in the reactor 9, and the voltage at point 7 varies. If the total capacitance of the entire drain-source parasitic capacitors of the MOS-FET1 and MOS-FET2 as seen from point 7 is represented by C, the internal resistance of the reactor 9 is represented by r, and the current of the reactor 9 at turn-off time of the MOS-FET's is represented by $I_L$, then the voltage u at point 7 and the current i through point 7 can be given by the following equations (4) and (5) for switchover of ON state from MOS-FET1 to MOS-FET2 and by the following equations (6) and (7) for switchover of ON state from MOS-FET2 to MOS-FET1.

$$u = e^{-at}[(Ei-Ec+rI_L)\cos\omega t + \{a(Ei-Ec+rI_L) - (I_o+I_L)C\} \cdot (1/\omega)\sin\omega t] + (Ec-rI_L) \qquad (4)$$

$$i = e^{-at}[(I_o+I_L)\cos\omega t + \{(Ei-Ec)/L - a(I_o+I_L)\} \cdot (1/\omega)\sin\omega t] \qquad (5)$$

$$u = e^{-at}[(-Ec+rI_L)\cos\omega t + \{a(-Ec+rI_L) - (-I_o+I_L)/C\} \cdot (1/\omega)\sin\omega t] + (Ec-rI_L) \qquad (6)$$

$$i = e^{-at}[(-I_o+I_L)\cos\omega t + \{(-Ec)/L + a(I_o+I_L)\}] \cdot (1/\omega)\sin\omega t \qquad (7)$$

Here, $a = r/2L$ and $\omega = \sqrt{1/LC - 1}$.

If the internal resistance r of the reactor 9 is sufficiently small and the time necessary for the voltage at point 7 to change into its next state is sufficiently short as compared with the intrinsic period of LC, the above equations (4) through (7) can be simplified into the following expressions (8) through (11) with a sufficient degree of approximation, respectively. For the switchover of ON state from MOS-FET1 to MOS-FET2

$$u = Ei - (I_o + I_L) \cdot t/c \tag{8}$$

$$i = I_o + I_L + (Ei - Ec) \cdot t/C \tag{9}$$

For the switchover of ON state from MOS-FET2 to MOS-FET1

$$u = (I_o - I_L) \cdot t/c \tag{10}$$

$$i = (-I_o + I_L) - Ec \cdot t/C \tag{11}$$

The equations (8) through (11) show that the variation of the voltage at point 7 is substantially linear. With the condition for positive slope of the voltage of the equation (10), the peak value $I_L$ of the reactor current and the load current $I_o$ must satisfy the following conditions.

$$i_o < I_L = Ei(1-D)D/2 \cdot f \cdot L \tag{12}$$

During the switchover of the voltage at point 7, the two MOS-FET's must be simultaneously turned off, and the dead time Td during which the two MOS-FET's are OFF can be derived as follows from the equation (11).

$$Td \geq Ei \cdot C/(I_o - I_L) \tag{13}$$

As can be seen from the foregoing description, with the circuit configuration of the invention, it is possible to completely eliminate surge currents at switchover of switch elements due to the charging and discharging of parasitic capacitors of the switch elements through the internal resistances of such switch elements. Further, values of constants necessary in the invention such as the inductance of the reactor 9 and the duration of the dead time can be determined by simple equations.

With the prior art, several methods have been used to protect switch elements against the surge current at the time of switchover of the switch elements and to prevent noise in the voltage and current due to such surge currents; namely, connection of gate resistors of several hundred ohms to the gates of MOS-FET's for reducing the rate of rise of the gate voltage, suppression of the current peak value by gradually reducing the drain-source resistance of the MOS-FET to its complete ON state at the time of its turn-ON, and use of means for preventing sudden changes of voltage and current such as the snubber circuits formed of resistors and capacitors so as to prevent occurrence of the surge current. However, such conventional methods could not ensure complete elimination of the surge current, and the electric charge stored in the parasitic capacitors of the MOS-FET's are eventually consumed in the on-time drain-source resistance of each MOS-FET. Thus, with the increase of frequency of the switchover of the switch elements, problems of increased power consumption and increased heat generation are inevitable, and such problems have not been solved.

In the above description of the principles of the invention, MOS-FET1 and MOS-FET2 are used as examples of the switch elements 1 and 2. When bipolar transistors, gate turn off transistors (GTO), or regular thyristors are used as the switch elements of the switching power source means, parasitic capacitors of such transistors and thyristors also cause problems similar to those related to the MOS-FET's, and the invention can solve the problems with the above transistors and thyristors.

Thus, the invention can reduce the number of surge absorbing elements in the switching power source means as compared with the conventional power source means of similar type. Since the power consumption at the time of switchover can be kept low, the frequency of the switchover can be increased, and various components such as the smoothing choke coils and capacitors can be made small. When applied to the output voltage control, the invention can permits a faster response and facilitates more sophisticated fine control of the output voltage.

Figure 3:
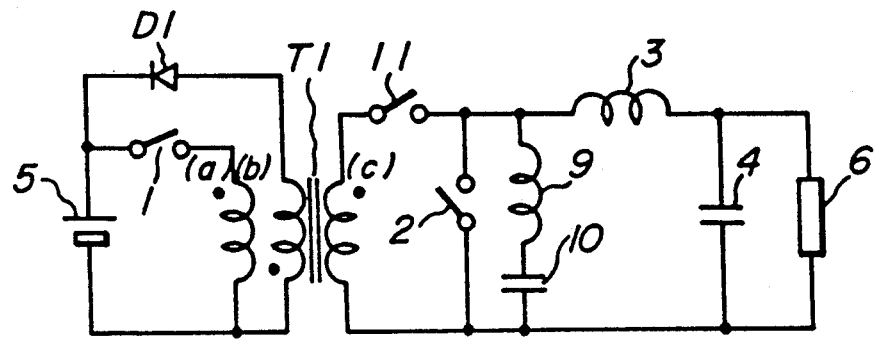
FIG. 3 is a circuit diagram of a forward type power source to which the switching power source means of the invention is applied.

Other embodiments will be described now. FIG. 3 shows a forward type switching power source to which the present invention is applied. Switch elements 1 and 2 are paired, and when one of them is ON the other is controlled to be OFF. A switch element 11 is so controlled as to turn-ON and turn-OFF substantially simultaneously with the switch element 1. During switchover of the switch elements 1, 11 and 2 the energy stored in the reactor 9 is used to charge and discharge parasitic capacitors of such switch elements 1, 11, 2 and a transformer T1.

Figure 4:
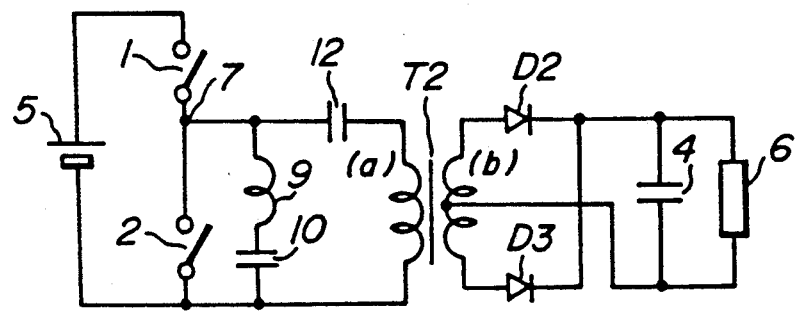
FIG. 4 is a circuit diagram of a DC power source for an inverter to which the switching power source means of the invention is applied.

FIG. 4 shows a power source for an inverter, in which output from a switching power source means of the invention is connected to primary winding of a transformer T2 and the output is rectified by diodes D2 and D3 that are connected to the secondary winding of the transformer T2, so as to provide a DC output. Switch elements 1 and 2 are paired, and when one of them is ON the other is controlled to be OFF. The power source of FIG. 4 uses a capacitor 12 for cutting off the DC component of the output from the switching power source means of the invention. During switchover of the switch elements 1 and 2, the energy stored in the reactor 9 is used to charge and discharge parasitic capacitors of switch elements 1, 2 and the transformer T2. Parasitic capacitors across terminals of the diodes D2 and D3 are also charged and discharged by the energy stored in the reactor 9, and surge currents due to recovery currents (reverse direction currents caused during the switchover) never occur.

Figure 5:
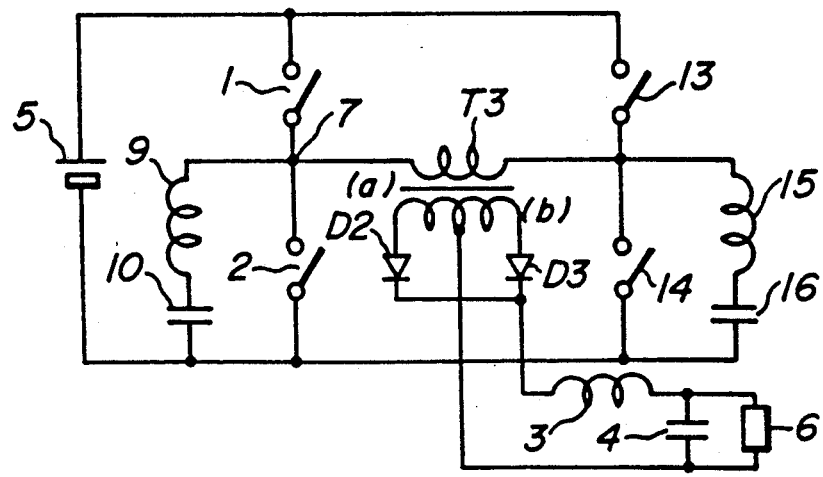
FIG. 5 is a circuit diagram of a full bridge type power source to which the switching power source means of the invention is applied.
Figure 6:
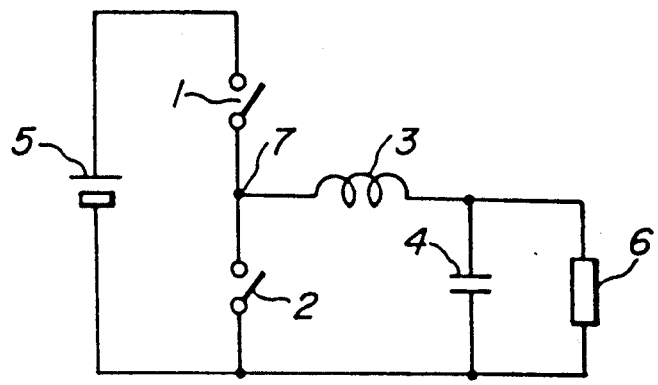
FIG. 6 is a circuit diagram of the essential configuration of a conventional switching power source means.
Figure 7A:
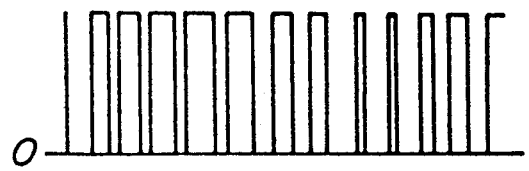
FIGS. 7A and 7B show waveforms of voltages at different points of the essential configuration of FIG. 6.
Figure 7B:
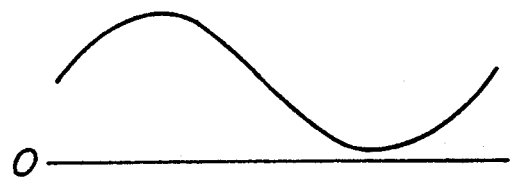
Figure 8:
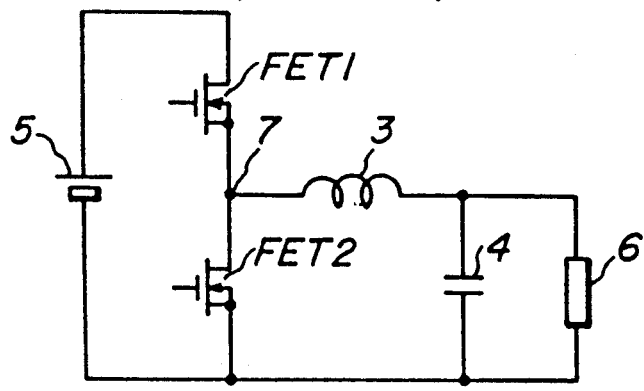
FIG. 8 is a circuit diagram of the formation of a conventional switching power source means which uses MOS-FET's as switch elements.

FIG. 5 shows a full bridge inverter circuit. AC voltages produced by the switching power source means of the invention are applied to the primary winding of a transformer T3 and rectified by diodes D2 and D3 connected to the secondary winding of the transformer T3. Switch elements 1 and 2 are paired, and switch elements 13 and 14 are similarly paired. When one of the paired switch elements is ON the other one of the paired switch elements is controlled to be OFF. A DC output of any desired magnitude can be produced by controlling phase difference between the switching element 1-2 pair and the switching element 13-14 pair. In this embodiment, the energy stored in reactors 9 and 15 is used to charge and discharge parasitic capacitors of the switch elements, the transformer, and the diodes during switchover of the switch elements. Hence, power loss in the switch elements during the switchover is kept at a very low level.

The switch elements 1, 2, 13 and 14 in the embodiments of FIG. 3 through FIG. 5 can be MOS-FET's, bipolar transistors, GTO's, thyristors, or diodes.

As can be seen from the foregoing detailed description, the outstanding effects of the invention can be summarized as follows.

(1) A high efficiency of electric power in the switching power source means is achieved.

(2) Due to the reduction of heat generation at constituent elements, heat dissipating fins and other fringe parts can be made small.

(3) Reliability of the constituent elements is improved because surge currents are substantially eliminated.

(4) Need of conventional fringe elements such as snubber circuits and noise filters can be removed.

(5) Higher switching frequencies than before can be used, and size of circuit elements such as transformers and filters can be reduced.

Although the invention has been described with a certain degree of particularity, it is understood that the present disclosure has been made only by way of example and that numerous changes in details of construction and parts may be resorted to without departing from the scope of the invention as hereinafter claimed.

What is claimed is:

1. A switching power source, comprising:
a DC voltage source;
a first switch element connected to said DC voltage source;
low-pass filter means having an output end for connection to a load and an output end selectively connectable to said DC voltage source through said first switch element;
a second switch element connected in parallel relative to the input end of said low-pass filter means, said first and second switch elements having parasitic capacitors and being turned on and off so that an output signal of desired frequency is produced at the output end of said lowpass filter means;
a reactor connected in parallel with said second switch element for charging and discharging said parasitic capacitors during a switching operation when said first switch element is switched off and said second switch element is switched on, and vice versa; and
a capacitor connected in series with said reactor so that the series connection of said reactor and said capacitor is in parallel with said second switch element, wherein said first and second switch elements are directly connected together at a common connection point, and the series connection of said reactor and said capacitor is connected directly to said common connection point, wherein said first and second switch elements each comprise a MOS-FET having parasitic capacitors.

2. A switching power source as defined in claim 1, wherein said first switch element has an electrode connected to a positive pole of said DC voltage source and said second switch element has an electrode connected to a negative pole of said DC voltage source.

3. A switching power source, comprising:
a DC voltage source;
a first switch element connected to said DC voltage source;
low-pass filter means having an output end for connection to a load and an input end selectively connectable to said DC voltage source through said first switch element;
a second switch element connected in parallel relative to the input end of said low-pass filter means, said first and second switch elements having parasitic capacitors and being turned on and off so that an output signal of desired value is produced at the output end of said low-pass filter means;
a reactor connected in parallel with said second switch element for charging and discharging said parasitic capacitors during a switching operation when said first switch element is switched off and said second switch element is switched on, and vice versa;
a transformer connected between said first switch element and said low-pass filter means;
a first capacitor connected in series with said reactor so that the series connection of siad reactor and said first capacitor is in parallel with said second switch embodiment, wherein said first and second switch elements have a common connection point; and
a second capacitor connected between said common connection point and said transformer.

4. A switching power source as defined in claim 3, wherein said transformer has a primary circuit and a secondary circuit, and said DC voltage source, first and second switch elements and series connection of said capacitor and reactor are all connected in said primary circuit, and said secondary circuit includes diode means for rectifying the output signal to produce a DC output.

5. A switching power source, comprising:
a DC voltage source;
a first switch element connected to said DC voltage source;
low-pass filter means having an output end for connection to a load and an input end selectively connectable to said DC voltage source through said first switch element;
a second switch element connected in parallel relative to the input end of said low-pass filter means, said first and second switch elements having parasitic capacitors and being turned on and off so that an output signal of desired value is produced at the output end of said low-pass filter means;
a reactor connected in parallel with said second switch element for charging and discharging said parasitic capacitors during a switching operation when said first switch element is switched off and said second switch element is switched on, and vice versa; and
a transformer connected between said first switch element and said low-pass filter means, wherein said transformer has a primary circuit and a secondary circuit, said DC voltage source and said first switch element being connected in said primary circuit, and said second switch element and said reactor being connected in said secondary circuit.

6. A switching power source, comprising:
a DC voltage source;
a first switch element connected to said DC voltage source;
low-pass filter means having an output end for connection to a load and an input end selectively connectable to said DC voltage source through said first switch element;
a second switch element connected in parallel relative to the input end of said low-pass filter means, said first and second switch elements having parasitic capacitors and being turned on and off so that an output signal of desired value is produced at the output end of said low-pass filter means;

a reactor connected in parallel with said second switch element for charging and discharging said parasitic capacitors during a switching operation when said first switch element is switched off and said second switch element is switched on, and vice versa;

a transformer connected between said first switch element and said low-pass filter means; and a third switch element connected in series with both said second switch element and said reactor, said third switch element being controlled to turn on and off substantially simultaneously with said first switch element, and said third switch element and said transformer having parasitic capacitors which are charged and discharged by said reactor.

7. A switching power source, comprising:

a DC voltage source;

a first switch element connected to said DC voltage source;

low-pass filter means having an output end for connection to a load and an input end selectively connetable to said DC voltage source through said first switch element;

a second switch element connected in parallel relative to the input end of said low-pass filter means, said first and second switch elements having parasitic capacitors and being turned on and off so that an output signal of desired value is produced at the output end of said low-pass filter means;

a reactor connected in parallel with said second switch element for charging and discharging said parasitic capacitors during a switching operating when said first switch element is switched off and said second switch element is switched on, and vice versa;

a transformer connected between said first switch element and said low-pass filter means, wherein said transformer has a primary circuit including a primary winding and said first and second switch elements have a common connection point connected at one end of said primary winding;

third and fourth switch element having a common connection point connected at the other end of said primary winding; and a second reactor connected to said common connection point at the other end of said primary winding so as to be in parallel with said fourth switch element;

wherein said third switch element is connected to said DC voltage source, and said third and fourth switch elements and said second reactor operate similarly to said first and second switch elements and said reactor, respectively, to produce a full bridge inverter circuit.

8. A switching power source as defined in claim 7, and further comprising a first capacitor connected in series with said reactor so that the series connection of said first capacitor and said reactor is in parallel with said second switch element; and a second capacitor connected in series with said second reactor, the series connection of said second capacitor and said second reactor being in parallel with said fourth switch element.

* * * * *